United States Patent
Huang

(10) Patent No.: US 7,733,524 B2
(45) Date of Patent: Jun. 8, 2010

(54) MONOCHROMIC IMAGE PROCESSING SYSTEM AND METHOD FOR BACKGROUND REMOVAL ACCORDING TO DYNAMIC DATA

(75) Inventor: Chun-Chia Huang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 1037 days.

(21) Appl. No.: 11/447,199

(22) Filed: Jun. 6, 2006

(65) Prior Publication Data

US 2007/0280533 A1    Dec. 6, 2007

(51) Int. Cl.
 G06F 15/00   (2006.01)
 G06K 1/00    (2006.01)
 H04N 1/60    (2006.01)
 G06K 15/00   (2006.01)
 H04N 1/40    (2006.01)

(52) U.S. Cl. .................... 358/1.9; 358/3.23

(58) Field of Classification Search .......... 358/1.1, 358/1.9, 1.2, 2.1, 3.02, 3.06, 3.09, 3.1, 3.23
See application file for complete search history.

(56) References Cited

U.S. PATENT DOCUMENTS

| 5,850,298 A | 12/1998 | Narahara et al. |
| 7,272,252 B2 * | 9/2007 | De La Torre-Bueno et al. ......... 382/133 |
| 7,298,900 B2 * | 11/2007 | Kanatsu .................. 382/176 |

* cited by examiner

*Primary Examiner*—Douglas Q Tran
(74) *Attorney, Agent, or Firm*—Rabin & Berdo, P.C.

(57) ABSTRACT

A monochromic image processing system and method for background removal according to dynamic data firstly obtain pixel histogram data in part of an image during a photo/text separation process. Afterwards, look-up tables for executing a background removal process are generated immediately to remove background noise of all images simultaneously. This method can solve the problem that in the multi-source document copy mode the background noise of all images cannot be removed at the same time in the prior art. It also increases the flexibility in the background removal process in various copy modes.

16 Claims, 6 Drawing Sheets
(1 of 6 Drawing Sheet(s) Filed in Color)

MONOCHROMIC IMAGE PROCESSING SYSTEM AND METHOD FOR BACKGROUND REMOVAL ACCORDING TO DYNAMIC DATA

BACKGROUND OF THE INVENTION

1. Field of Invention

An image processing system and method and, in particular, to a monochromatic image processing system and method of generating look-up tables in real time according to dynamically obtained image pixel data for executing a background removal process.

2. Related Art

In the copy function of a multi-function peripheral (MFP), an image input device such as a scanner first captures the original image for various subsequent images processing before making copies.

Since the retrieval of the original image has some intrinsic problems, e.g., the source document paper is too thin, double side printed, too dirty, etc. or the source document may be extrinsically interfered during the process of capturing the original image; therefore, there may have a problem of smudge noises in the image data obtained by the scanner. If the smudge noises cannot be effectively removed, the image output quality will be seriously affected. Therefore, almost all of MFPs involve similar image processing, i.e., the so-called "background removal process" to remove undesired smudge noises.

The background removal process disclosed in U.S. Pat. No. 5,850,298 is completely implemented by hardware. In the implementation process, histogram data of pixel values obtained by scanning the first source document is used for executing subsequent background removal processes. However, this implementation process has the following drawbacks and problems:

1. The first source document is unable to go through the background removal process. However, in U.S. Pat. No. 5,850,298, the histogram data of pixel values are generated by reading the complete first source document. Therefore, only source documents other than the first source document can be processed with background removal. As a result, the output quality of the source document apparently cannot satisfy the desired standard. This method is of almost useless for a single source document copy mode.

2. It lacks of flexibility in the background removal process for multiple copy modes. Usually, according to the types of source documents, there are several different copy modes, including the text mode, the photo mode, and the auto mode.

In the text mode, all blocks are considered as text blocks for copying. In the photo mode, all blocks are considered as photo blocks for copying. In the auto mode, the blocks are classified into the categories of text, photo, and border blocks for copying.

Different copy modes require different parameters for the background removal process. However, in U.S. Pat. No. 5,850,298, there is no related parameter adjusting mechanism for the background removal process in different copy modes. It does not provide different look-up tables for different copy modes, either. Therefore, in the copy process with multiple source documents, the background removal process effect is very limited if the source documents differ very much in properties.

3. The background removal process structure using completely hardware lacks of flexibility. U.S. Pat. No. 5,850,298 uses purely hardware to implement the background removal process. Since the process of adjusting parameters for different copy modes cannot be very dynamical and the required cost is higher, the flexibility is thus lower, which can't meet the need for future products.

In summary, the existing background removal mechanisms still have many drawbacks. In view of recent progress in hardware and software technologies, it is necessary to provide a new structure to solve the above-mentioned problems and handle processes that cannot be handled by the conventional method. Therefore, the output quality, applications, and flexibility of the background removal process can be greatly improved to satisfy the requirements of product designs.

SUMMARY OF THE INVENTION

In view of the foregoing, an object of the invention is to provide a monochromatic image processing system for background removal according to dynamical data and method thereof. The invention combines software and hardware to dynamically obtain the look-up tables for the background removal process. The original image of the first source document may fully and simultaneously perform the background removal process to improve the situation that the background removal process cannot be synchronized in the prior art. Besides, the look-up tables can set different parameters of mode properties according to different copy modes selected by the user (e.g., the text mode, photo mode or auto mode) so as to let the look-up tables fitting in different copy modes. Therefore, the invention can increase the flexibility of the background removal process in multiple copy modes.

To achieve the above object, the monochromatic image processing system for background removal according to dynamical data includes at least: a memory module, a photo/text separation module, a dynamical look-up table generation module, and an image background removal module.

The corresponding method of the invention includes at least the following steps:

(1) At time T1, the photo/text separation module reads in sequence pixel data from the Nth pixel band that contains M pixel blocks stored in the memory module.

(2) Each block property of the pixel block of the M pixel blocks is generated by the photo/text separation and stored in the memory module. Moreover, the pixel histogram data from all pixel data of pixel blocks with text property in the M pixel blocks are generated and stored in the memory module.

(3) The dynamical look-up table generation module determines the black- and white-reference point sets according to the pixel histogram data and different parameters of mode properties, thereby generating the corresponding look-up tables.

(4) Before all the pixel data are processed, at time T2 the image background removal module selects a look-up table according to the block property of each block in these M pixel blocks and performs the background removal process for all pixel data in these M pixel blocks in accordance with each selected look-up table.

The invention incorporates both hardware and software; therefore, it can execute different process at different time interval. For example, at time T1, the hardware photo/text separation module and the firmware dynamical look-up table generation module are used to generate the required block property and look-up tables, respectively. At time T2, the hardware image background removal module is employed to perform the background removal process on the image. At this moment, the photo/text separation module and the dynamical look-up table generation module continue to read in subsequent image pixels for processing. This method enables the invention to completely and synchronously finish the background removal process for the original image of the first source document.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This file of this patent contains at least one drawing executed in color. Copies of this patent with color drawing(s) will be provided by the Patent and Trademark Office upon request and payment of the necessary fee.

The present invention will become more fully understood from the detailed description given hereinbelow illustration only, and thus are not limitative of the present invention, and wherein.

DETAILED DESCRIPTION OF THE INVENTION

Figure 1:
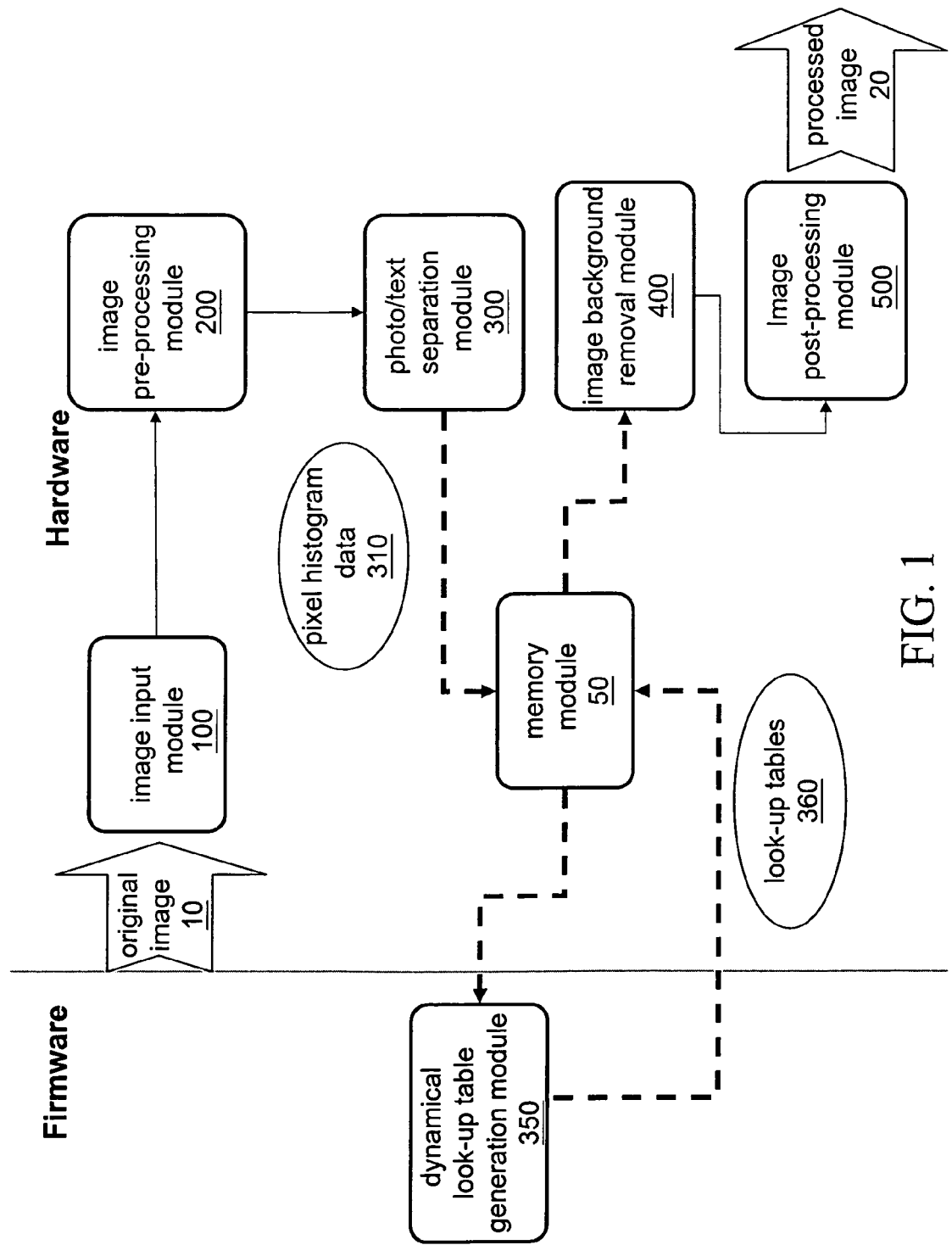
FIG. 1 is a block diagram of the monochromatic image processing system for background removal according to dynamical data of the present invention.

The invention relates to a monochromatic image processing system and method for background removal according to dynamical data. It may be applied in the MFPs. The basic system block diagram is shown in FIG. 1.

Regarding the hardware operation part, the original image 10 to be output is extracted by an image input module 100 (e.g., a scanner). After obtaining the pixel data of the original image 10, an image pre-processing module 200 may need to perform some basic image processing on the image, including pixel linearization, Gamma corrections, etc. These are well-known in the prior art. For this invention, the image data will be subsequently converted from its original data format (such as RGB) into a suitable format (such as YCrCb) for further process. For specific mono MFP application, usually, the Y channel data is kept while the other chroma information (Cr and Cb) are omitted. The features of the invention start after the image pre-processing module 200 finishes its processes where Y channel image data is generated as pixel data and stored into the memory module. We describe the features as follows.

The photo/text separation module 300 reads in the required pixel data according to the predetermined processing size, followed by the pixel data segmentation into pixel blocks. The predetermined processing size refers to the total numbers of pixel blocks to be read in each time for photo/text separation by the photo/text separation module 300. The predetermined processing size is usually computed in units of the pixel bands. Each pixel band may contain many pixel blocks, and each pixel block may contain many pixels. Usually, the predetermined processing size is A4 page wide and three-block height per pixel band when pixel block size is 64×64 pixel size and can be set differently according to the processing power and/or memory size of the memory module 50 of the system. After photo/text separation, pixel data is tagged with the corresponding block property in unit of the pixel block, such as text, photo or border block property. These block properties are then stored along with the related photo/text segmentation information in the memory module 50. The pixel histogram data 310 in the invention gives one example of the combination of photo/text segmentation information and pixel data from all pixel blocks with text properties. They are stored in the memory module 50 after completing the photo/text separation.

Afterwards, the dynamical look-up table generation module 350 implemented by firmware reads in the pixel histogram data 310 generated by the photo/text separation module 300. Predetermined parameters for different mode properties are used to generate the required look-up tables 360 for image background removal under different copy modes. Likewise, they are stored in the memory module 50. (The detailed generation process of the look-up tables 360 is described later.)

Back to the hardware operation, the image background removal module 400 reads out the pixel data processed by the photo/text separation module 300 from the memory module 50. Afterwards, one table in the look-up tables 360 required for performing the image background removal process is dynamically selected according to each block property of the processed pixel data in the different copy modes (text mode, photo mode, and auto mode) to generate the background noise removed image data for image post-processing module 500.

The pixel data which has finished the image background removal process may still need to be further processed before outputting the processed image 20. Therefore, an image post-processing module 500 is used to process such tasks, including scaling, halftoning, CODEC, etc. These processes are belonged to the prior art and are not described herein.

Figure 2:
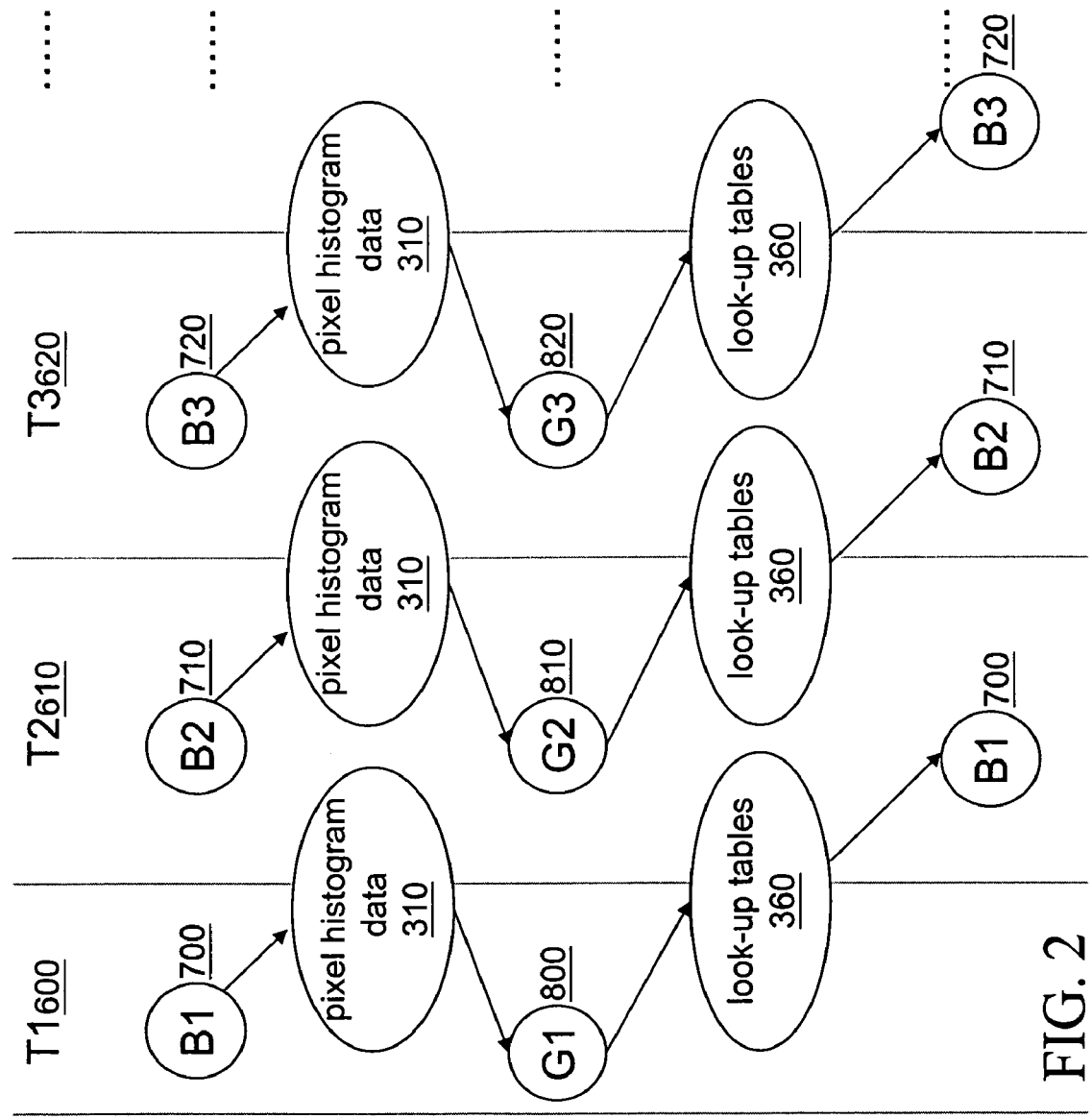
FIG. 2 is a schematic view showing the operations of a local portion of the monochromatic image processing method for background removal according to dynamical data of the present invention.
Figure 2:
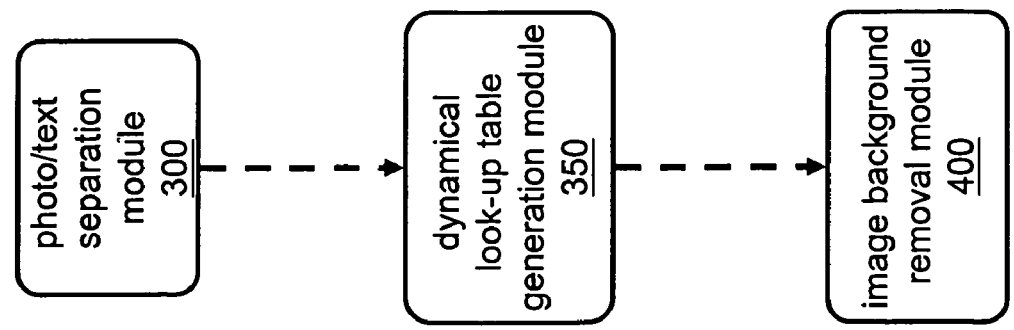

FIG. 2 shows the operation of a local portion of the invention, particularly the portion illustrating the technical features of the invention. In fact, the technical features of the invention reside in the software and hardware interactions among the memory module 50, the photo/text separation module 300, the dynamical look-up table generation module 350, and the image background removal module 400. To simplify the explanation, we omit the explanation of the memory module 50 even though the operation of the entire system requires the existence of the memory module 50.

The drawing highlights the software and hardware interactions of the invention. An embodiment of the present invention uses a real operation of the photo/text separation module 300, the dynamical look-up table generation module 350, and the image background removal module 400 in three time intervals, that is the first time T1 600, the second time T2 610, and the third time T3 620, for explanation. Suppose in the three time intervals, the pre-processing pixel sizes read by the photo/text separation module 300 are the first pixel band B1 700, the second pixel band B2 710, and the third pixel band B3 720, respectively for generating the corresponding pixel histogram data 310. At the three time intervals, the dynamical generation processes for producing the look-up tables 360 by the dynamical look-up table generation module 350 are the first dynamical look-up tables generation process G1 800, the second dynamical look-up tables generation process G2 810, and the third dynamical look-up tables generation process G3 820, respectively. The drawing shows that at the first time T1 600, the photo/text separation module 300 reads in the first pixel band B1 700 for photo/text separation and generates the corresponding pixel histogram data 310 for the dynamical look-up table generation module 350. The dynamical look-up table generation module 350 performs the first dynamical look-up tables generation process G1 800 according to the pixel histogram data 310 generated by the photo/text separation module 300 to generate the look-up tables 360 for the image background removal module 400 to use. At the second time T2 610, the image background removal module 400 performs the image background removal for the first pixel band B1 700 using the look-up tables 360 generated by the dynamical look-up table generation module 350 in the first dynamical look-up tables generation process G1 800.

It should be mentioned that at the second time T2 610, when the image background removal module 400 performs the image background removal for the first pixel band B1 700, the photo/text separation module 300 already starts another photo/text separation process. At this moment, the second pixel band B2 710 is read in for photo/text separation. Likewise, the photo/text separation module 300 generates the corresponding pixel histogram data 310 to the dynamical look-up table generation module 350. The dynamical look-up table generation module 350 also executes the second dynamical look-up tables generation process G2 810 at the second time T2 610 according to the pixel histogram data 310 produced by the photo/text separation module 300 and generates the look-up tables 360 for the image background removal module 400 to use at the next time interval, i.e. the third time T3 620.

Likewise, the photo/text separation module 300 performs the third photo/text separation at the third time T3 620 by reading in the third pixel band B3 720. The operations of the dynamical look-up table generation module 350 and the image background removal module 400 follow this pattern, as shown in the drawing, until all the pixel data are processed.

Figure 3:
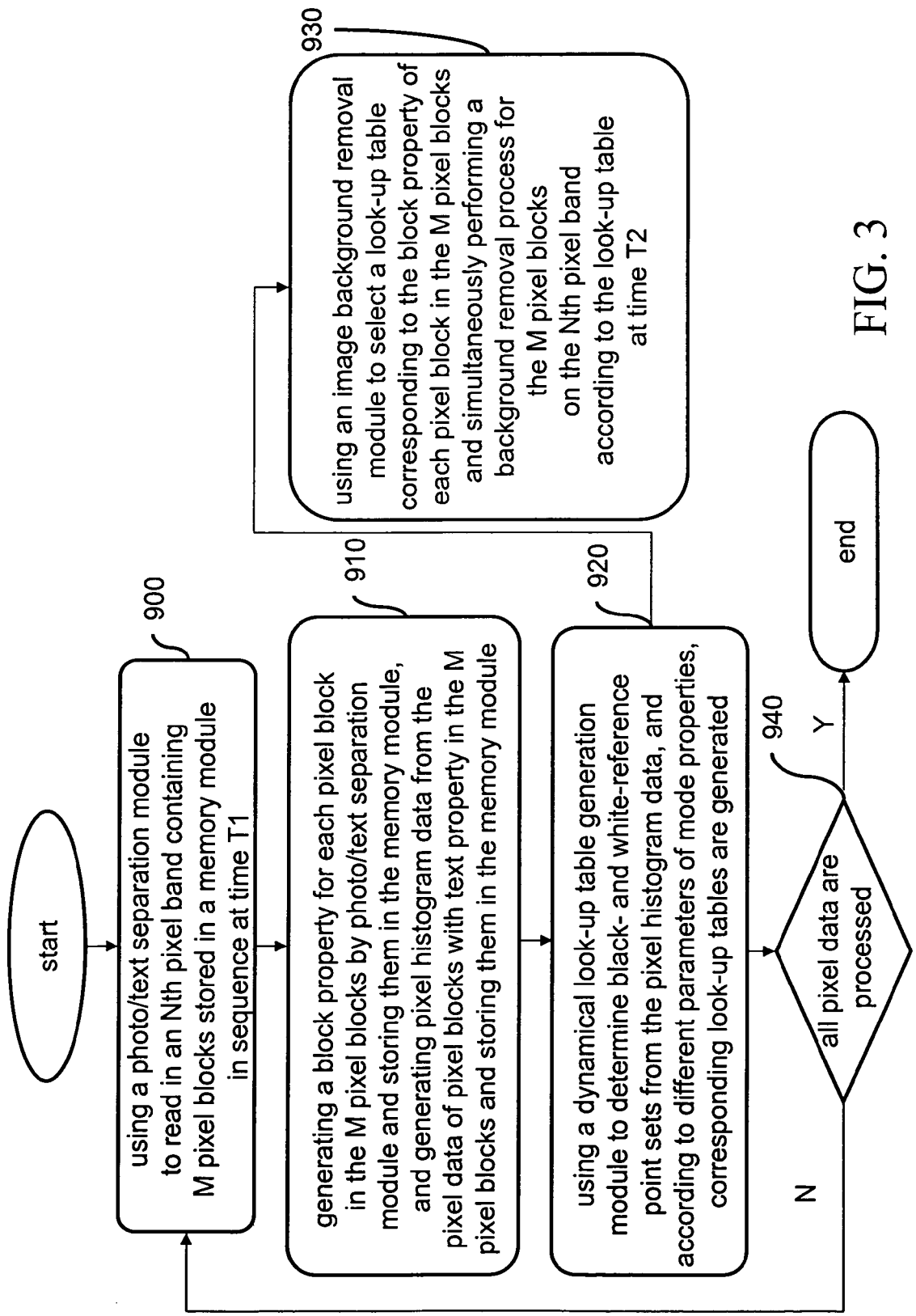
FIG. 3 is the flowchart of a local portion of the monochromatic image processing method for background removal according to dynamical data of the present invention.

In FIG. 3, we provide an explicit example to explain the monochromatic image processing method for background removal according to dynamical data. Here we suppose the predetermined processing size is a pixel band, containing M pixel blocks.

First, the photo/text separation module 300 reads in sequence an Nth pixel band containing M pixel blocks (step 900). The source of reading is the memory module 50. The data being read in are the pixel data processed by the image pre-processing module 200. Afterwards, the block property of each block in the M pixel blocks are generated by the photo/text separation module and stored (in the memory module 50). The pixel data from the pixel blocks with text property are collected and analyzed, generating a pixel histogram data for storage (step 910). The dynamical look-up table generation module 350 determines black- and white-reference point sets corresponding to different copy modes (e.g., text mode, photo mode, and auto mode) using the pixel histogram data 310 and the predetermined different parameters of mode properties, thereby generating the corresponding look-up tables 360 (step 920). The detailed steps will be further described in FIG. 4. The image background removal module 400 selects a corresponding look-up table from the look-up tables 360 according to the block property of each pixel block in the M pixel blocks, and simultaneously performs the background removal process for the M pixel blocks on the Nth pixel band (step 930).

Before finishing the processing with the entire pixel data (step 940), as mentioned previously, the photo/text separation module 300 continues to read in the subsequent (N+1)th pixel band for photo/text separation while the image background removal module 400 processes the background removal on the Nth pixel band. The dynamical look-up table generation module 350 continues with the dynamical look-up tables generation process. Steps 900 to 940 are repeated until the entire pixel data from image pre-processing module 200 are processed.

Figure 4:
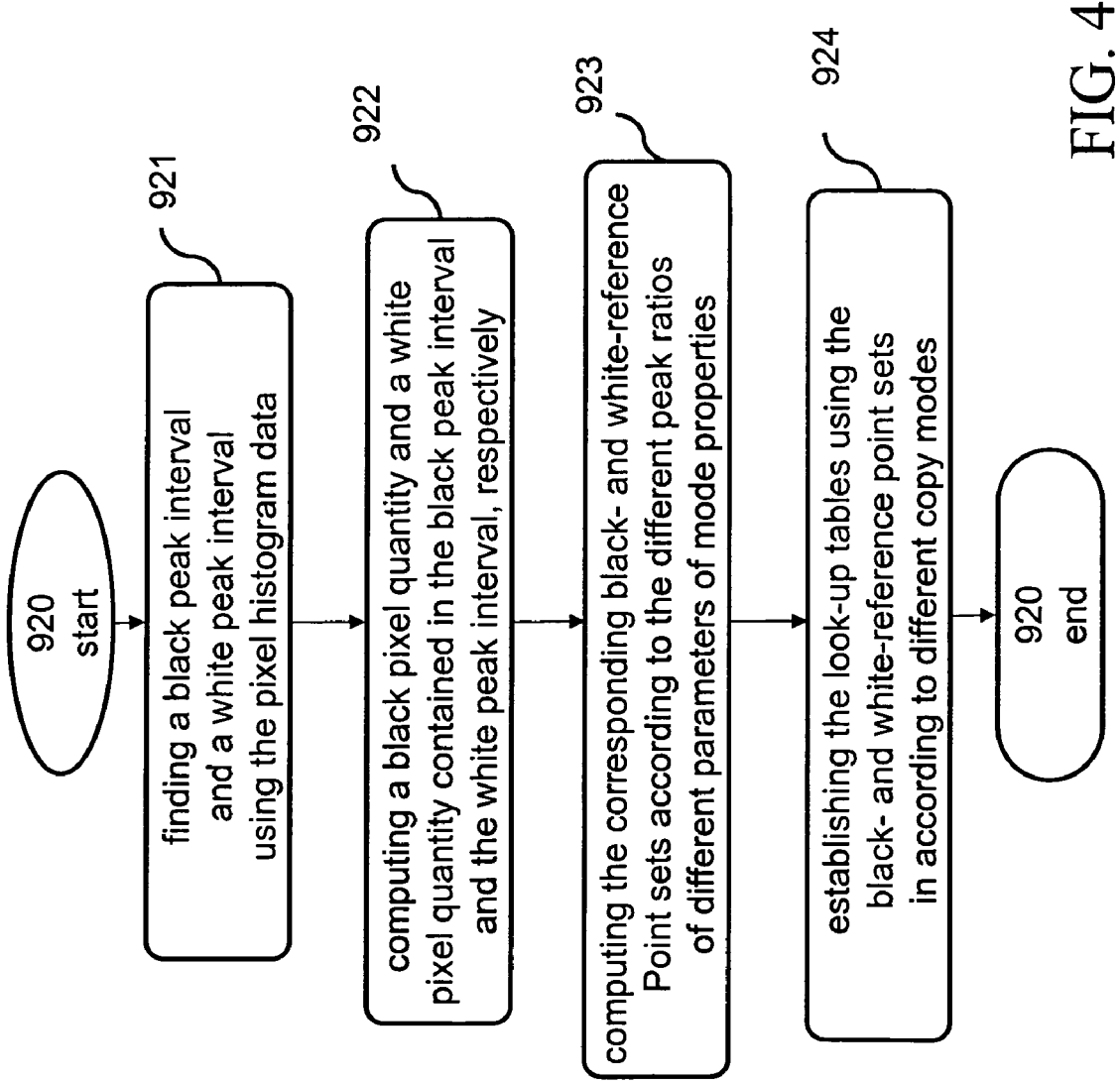
FIG. 4 is a flowchart showing the details of step 920 of FIG. 3 of the present invention.

FIG. 4 shows the detailed steps of step 920. This part is implemented basically by the firmware dynamical look-up table generation module 350.

First, a black peak interval 40 and a white peak interval 45 (in FIG. 5) are found from the pixel histogram data 310. Usually, the black peak interval 40 and the white peak interval 45 are determined by their respective most left black or most right white peak interval and a predetermined peak threshold interval 30 (step 921). The predetermined peak threshold interval 30 normally contains three thresholds: an upper limit threshold, a reference threshold, and a lower limit threshold, which are determined according to different needs. Therefore, the formation of the black peak interval will be that between these most close to pixel value zero's pixels with pixel quantity once greater than the upper limit threshold, with pixel quantity continuously greater than its previous neighbored pixel's that are all greater than the reference threshold in the predetermined peak threshold interval 30 and the pixel which is just before the pixel that has pixel quantity less than the lower limit threshold forms a black peak interval 40. While the formation of the white peak interval 45 is from these pixels most close to pixel value 255 with similar method. After the black peak interval 40 and the white peak interval 45 are found, the black pixel quantity and the white pixel quantity in the black peak interval 40 and the white peak interval 45 are computed, respectively (step 922). That is, the sum of the pixel quantity of black pixels in the black peak interval 40 and the sum of the pixel quantity of white pixels in the white peak interval 45 are calculated, respectively. Afterwards, the corresponding black- and white-reference point sets are generated according to the different peak ratios which are according to different parameters of mode properties (step 923) of black and white pixel quantities in its corresponding peak interval. Finally, the look-up tables 360 are established according to the corresponding black- and white-reference point sets and established in according to different copy modes (step 924).

The computation of black- and white-reference point sets can be described as follows:

resulted ratio=sum of $N$ pixel quantity in the peak interval/black or white pixel quantity in the peak interval*100%;

N means the number of pixel value in the peak interval. And N is used for determining each black- or white-reference point when accumulating resulted ratio greater than a predetermined peak ratio wherein:

black-reference point=the pixel value of $N$+1.

white-reference point=the pixel value of $N$−1.

Meanwhile, the predetermined peak ratios for black and white peak intervals can be dynamically adjusted and set differently for determining black- and white-reference point sets according to different parameters of mode properties.

Usually, the predetermined peak ratios and the determined pixel values of black- and white-reference point sets of different mode properties differ slightly.

For example, both the black peak ratio and white peak ratio in different block properties of different copy modes have the following relation:

>Peak ratio of text block (of the text or auto mode)
>>peak ratio of border block (of the auto mode)
>>peak ratio of photo block (of the photo or auto mode).

The pixel value of white reference point in different block properties of different copy modes has the following relation:

>White reference point of text block (of the text or auto mode)<white reference point of border block (of the auto mode)<white reference point of photo block (of the photo or auto mode).

The pixel value of black reference point in different block properties of different copy modes has the following relation:

>Black reference point of text block (of the text or auto mode)>black reference point of border block (of the auto mode)>black reference point of photo block (of the photo or auto mode).

Figure 5:
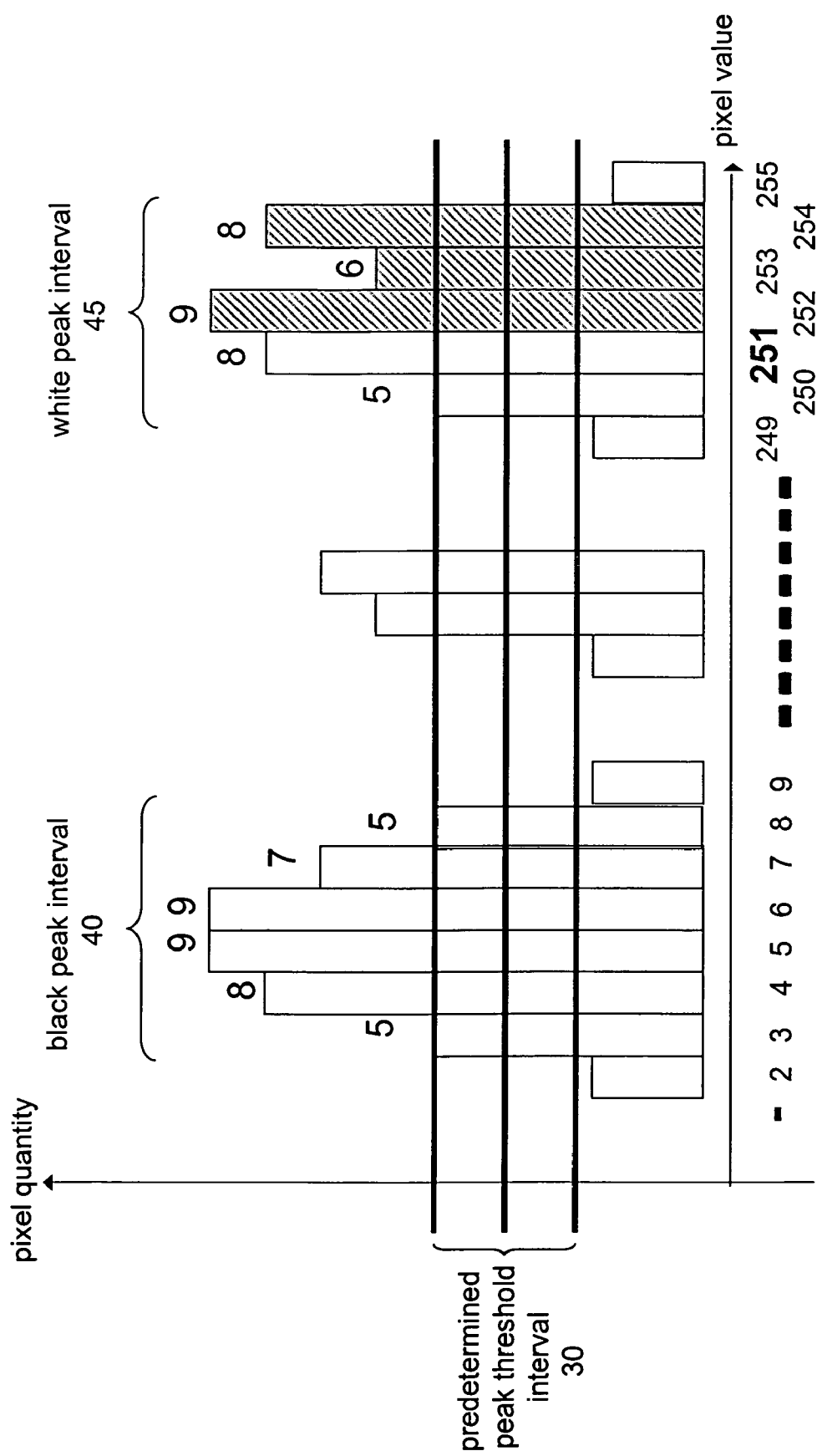
FIG. 5 is a schematic view of the embodiment of FIG. 4 of the present invention.

FIG. 5 shows the details of the embodiment in FIG. 4. The drawing shows that the black pixel interval and the white pixel interval fall respectively between pixel value 2-9 and pixel value 249-255. The predetermined peak threshold interval 30 is also indicated in the drawing. Therefore, it is possible to obtain the black peak interval (pixel value 3-8) 40 and white peak interval (pixel value 250-254) 45 with these pixels' pixel quantity satisfying the formation of peak inside the black peak interval and white peak interval by the threshold of the predetermined peak threshold interval 30.

Here we try to find the white reference point as an example to further explain the invention. Computations show that in the white peak interval (pixel value 250-254) 45, the white pixel quantity is 36 in pixel quantity (i.e., 5+8+9+6+8). If partial pixels' accumulated pixel quantity is greater than the predetermined peak ratio, the white reference point can be found. For example, if the predetermined peak ratio is such that it must includes 60% of the pixel quantity in the white peak interval 45, then the sum of the pixel quantity of the three pixels (pixel value 252-254) which is 23 (i.e., 9+6+8)/the white pixels quantity is 23/36*100%, or about 63.9%, is greater than the predetermined peak ratio, 60%. Therefore, the pixel value 251 which is less than and next to pixel value 252 is determined to be the location of the actual pixel value of the white reference point. The method of determining the black reference point is the same only the predetermined peak ratio maybe different and the starting accumulating pixel quantity is from the pixel value close to pixel value zero's. However, under different copy modes, the parameter settings of mode properties directly influence the locations of the black/white reference points. In practice, the setting can be flexibly adjusted in the firmware.

Figure 6B:
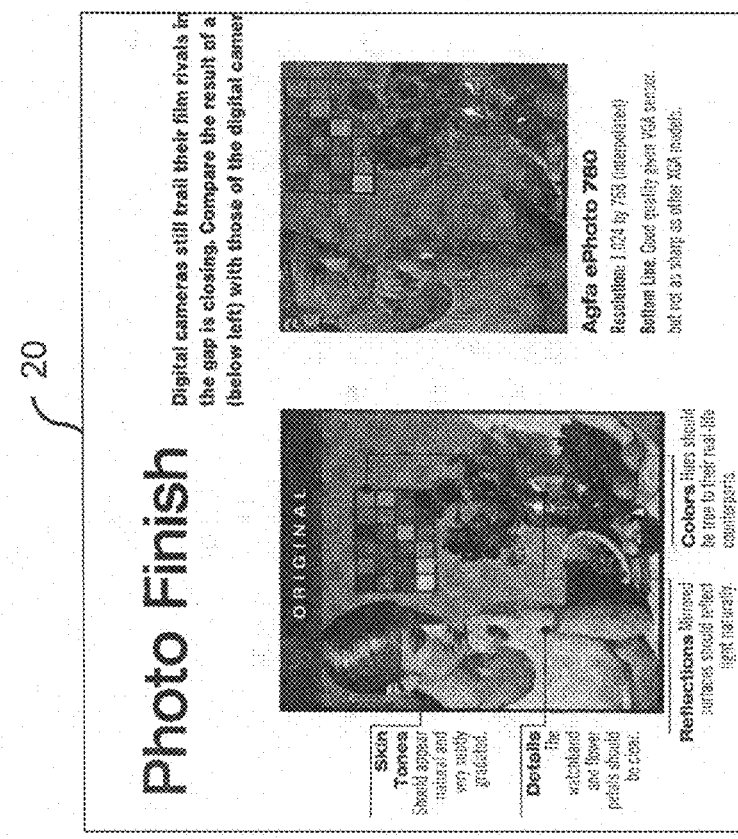
FIGS. 6a and 6b show and contrast the original image and the processed image using the system and method of the present invention.
Figure 6A:

After the generation of the look-up tables 360, the background removal process may be directly performed. FIGS. 6a and 6b show and contrast the original image 10 and the image background removal module 400 output image using the disclosed techniques. It is obvious that the smudge noises produced by the paper media of the original image 10 are largely removed by the background removal process. The subsequent processed image 20 outputs by the invention will have much better quality. Moreover, the invention can simultaneously complete the background removal process of all the original images 10. This solves the problems existing in the prior art, showing the values of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A monochromatic image processing method of background removal according to dynamical data, the method comprising the steps of:

using a photo/text separation module to read in an Nth pixel band containing M pixel blocks stored in a memory module in sequence at time T1;

generating a block property for each pixel block in the M pixel blocks by photo/text separation module and storing them in the memory module, and generating pixel histogram data from the pixel data of pixel blocks with text property in the M pixel blocks and storing them in the memory module;

using a dynamical look-up table generation module to determine black- and white-reference point sets corresponding to different copy modes according to the pixel histogram data and different parameters of mode properties; and using an image background removal module to select a look-up table corresponding to the block property of each pixel block in the M pixel blocks and simultaneously performing a background removal process for all pixel data on the Nth pixel band according to the look-up table at time T2;

wherein at time T2 before all pixel data are processed, the photo/text separation module continues reading the (N+1)th pixel band containing M pixel blocks stored in the memory module for executing subsequent steps.

2. The method of claim 1, wherein the block properties include a text, a photo, and a border block properties.

3. The method of claim 1, wherein the step of using a dynamical look-up table generation module to determine the black- and white-reference point sets corresponding to different copy modes according to the pixel histogram data and different parameters of mode properties further includes the steps of:

finding a black peak interval and a white peak interval using the pixel histogram data;

computing a black pixel quantity and a white pixel quantity contained in the black peak interval and the white peak interval, respectively;

computing the corresponding black- and white-reference point sets according to the different peak ratios of different parameters of mode properties; and establishing the look-up tables using the black- and white-reference point sets of the corresponding copy modes.

4. The method of claim 3, wherein the black peak interval and the white peak interval are respectively distributions intervals of black pixels and white pixels according to the pixel histogram data and continuously satisfying a predetermined peak threshold interval.

5. The method of claim 3, wherein the copy modes include a text mode, a photo mode, and an auto mode.

6. The method of claim 3, wherein the different peak ratios of the black and white peak intervals of different copy modes have the following relation:

>peak ratio of text block (of the text or auto mode)
>>peak ratio of border block (of the auto mode)
>>peak ratio of photo block (of the photo or auto mode).

7. The method of claim 3, wherein the pixel values of black- and white-reference point sets for different parameters of mode properties are expressed in terms of the following relations:

> white reference point of text block (of the text or auto mode)<white reference point of border block (of the auto mode)<white reference point of photo block (of the photo or auto mode); and > black reference point of text block (of the text or auto mode)>black reference point of border block (of the auto mode)>black reference point of photo block (of the photo or auto mode).

8. The method of claim 3, wherein the black- and white-reference point sets for different parameters of mode properties are computed as follows:

> resulted ratio=sum of $N$ pixel quantity in the peak interval/black or white pixel quantity in the peak interval*100%;

wherein N means the number of pixel value in the peak interval;

wherein N is used for determining each black- or white-reference point when accumulating resulted ratio greater than a predetermined peak ratio;

> wherein black-reference point=the pixel value of $N+1$; and

> wherein white-reference point=the pixel value of $N-1$.

9. A monochromatic image processing system for background removal according to dynamical data, comprising:

a memory module;

a photo/text separation module, which is used to read in sequence an Nth pixel band containing M pixel blocks stored in the memory module for photo/text separation at time T1, generates a block property of each pixel block in the M pixel blocks, and generates pixel histogram data from the pixel blocks of text property and stores them in the memory module;

a dynamical look-up table generation module, which determines the black- and white-reference point sets corresponding to different copy modes according to the pixel histogram data and different parameters of mode properties, thereby generating the corresponding look-up tables; and an image background removal module, which selects a look-up table according to the block property of each pixel block in the M pixel blocks in the memory module at time T2 and performs background removal for the M pixel blocks on the Nth pixel band according to the look-up table;

wherein at time T2 before all pixel data are processed, the photo/text separation module continues reading the (N+1)th pixel band containing M pixel blocks stored in the memory module for executing subsequent steps.

10. The system of claim 9, wherein the block properties include a text, a photo, and a border block properties.

11. The system of claim 9, wherein before generating the corresponding look-up tables further comprising the procedures of:

finding a black peak interval and a white peak interval using the pixel histogram data;

computing a black pixel quantity and a white pixel quantity contained in the black peak interval and the white peak interval, respectively;

computing the corresponding black- and white-reference point sets according to the different peak ratios of different parameters of mode properties; and establishing the look-up tables using the black- and white-reference point sets of the corresponding copy modes.

12. The system of claim 11, wherein the black peak interval and the white peak interval are respectively distributions intervals of black pixels and white pixels according to the pixel histogram data and continuously satisfying a predetermined peak threshold interval.

13. The system of claim 11, wherein the copy modes include a text mode, a photo mode, and an auto mode.

14. The system of claim 11, wherein the different peak ratios of the black and white peak intervals in different parameters of mode properties have the following relation:

> peak ratio of text block (of the text or auto mode)
> >peak ratio of border block (of the auto mode)
> >peak ratio of photo block (of the photo or auto mode).

15. The system of claim 11, wherein the pixel values of black- and white-reference point sets for different copy modes are expressed in terms of the following relations:

> white reference point of text block (of the text or auto mode)<white reference point of border block (of the auto mode)<white reference point of photo block (of the photo or auto mode); and > black reference point of text block (of the text or auto mode)>black reference point of border block (of the auto mode)>black reference point of photo block (of the photo or auto mode).

16. The system of claim 11, wherein the black- and white-reference point sets for different modes are computed as follows:

> resulted ratio=sum of $N$ pixel quantity in the peak interval/black or white pixel quantity in the peak interval*100%;

wherein N means the number of pixel value in the peak interval;

wherein N is used for determining each black- or white-reference point when accumulating resulted ratio greater than a predetermined peak ratio;

> wherein black-reference point=the pixel value of $N+1$; and

> wherein white-reference point=the pixel value of $N-1$.

* * * * *